(12) United States Patent
Song et al.

(10) Patent No.: US 10,640,089 B2
(45) Date of Patent: May 5, 2020

(54) REMOTE CONTROL DEVICE AND VEHICLE INCLUDING THE SAME

(71) Applicants: Hyundai Motor Company, Seoul (KR); Kia Motors Corporation, Seoul (KR); Continental Automotive Systems Corporation, Icheon, Gyeonggi-Do (KR)

(72) Inventors: Dong June Song, Gyeonggi-do (KR); Sunghoon Lee, Gyeonggi-do (KR); Hyoung Lack Jung, Seoul (KR); Seungmin Jeong, Gyeonggi-do (KR); SeungJun Lee, Gyeonggi-do (KR); Yongwook Lee, Gyeonggi-do (KR)

(73) Assignees: Hyundai Motor Company, Seoul (KR); Kia Motors Corporation, Seoul (KR); Continental Automotive Systems Corporation, Icheon, Gyeonggi-Do (KR)

(*) Notice: Subject to any disclaimer, the term of this patent is extended or adjusted under 35 U.S.C. 154(b) by 0 days.

(21) Appl. No.: 16/169,711

(22) Filed: Oct. 24, 2018

(65) Prior Publication Data
US 2019/0126890 A1 May 2, 2019

(30) Foreign Application Priority Data
Nov. 2, 2017 (KR) .................. 10-2017-0145056

(51) Int. Cl.
| | |
|---|---|
| *B60R 25/40* | (2013.01) |
| *B60R 25/24* | (2013.01) |
| *C07C 9/00* | (2006.01) |
| *G07C 9/00* | (2020.01) |

(52) U.S. Cl.
CPC .......... *B60R 25/406* (2013.01); *B60R 25/241* (2013.01); *G07C 9/00309* (2013.01); *B60R 2325/101* (2013.01); *G07C 2009/0038* (2013.01); *G07C 2009/00325* (2013.01); *G07C 2009/00396* (2013.01); *G07C 2009/00555* (2013.01); *G07C 2009/00793* (2013.01); *G07C 2209/63* (2013.01)

(58) Field of Classification Search
CPC ...... G07C 9/00309; G07C 2009/00793; G07C 9/00174; G07C 2209/63; G07C 9/00944; G07C 2009/00261; G07C 2009/00507; G07C 2209/65; G07C 9/00111
USPC ........................................................ 340/5.72
See application file for complete search history.

(56) References Cited

U.S. PATENT DOCUMENTS

| | | | |
|---|---|---|---|
| 7,135,962 B2* | 11/2006 | Durbin | ............... B60R 25/2081 340/425.5 |
| 7,498,936 B2* | 3/2009 | Maeng | .................. G08B 21/24 340/10.3 |

(Continued)

FOREIGN PATENT DOCUMENTS

KR      2014-0090728 A     7/2014

*Primary Examiner* — Mark S Blouin
(74) *Attorney, Agent, or Firm* — Mintz Levin Cohn Ferris Glovsky and Popeo, P.C.; Peter F. Corless (57) ABSTRACT

A remote control device for a vehicle includes a vibration sensor sensing vibration of the remote control device; a communication unit performing communication with the vehicle; and a controller changing an operation mode of the remote control device based on a first signal received from the vehicle via the communication unit.

19 Claims, 9 Drawing Sheets

(56) References Cited

U.S. PATENT DOCUMENTS

7,646,285 B2 * 1/2010 Ochs .................... B60R 25/04
307/9.1
9,481,298 B2 * 11/2016 Tomita ................... G08G 1/205

* cited by examiner

REMOTE CONTROL DEVICE AND VEHICLE INCLUDING THE SAME

CROSS-REFERENCE TO RELATED APPLICATION

This application claims the benefit of priority to Korean Patent Application No. 10-2017-0145056, filed on Nov. 2, 2017 in the Korean Intellectual Property Office, the disclosure of which is incorporated herein by reference in its entirety as if fully set forth herein.

BACKGROUND

1. Technical Field

Embodiments of the present disclosure relate to a remote control device configured to control a vehicle, and a vehicle including the same, and more particularly, to a technology in which an operation mode of a remote control device is changed using a sensor disposed in the remote control device so that a battery of the remote control device can be efficiently used.

2. Description of the Related Art

Modern automobiles are equipped with several electronic devices such as a hands-free device, a global positioning system (GPS) receiver, a Bluetooth device, a Hi-pass device, and the like, for enhancing a driver's convenience. For example, whereas a key has been used in the past to manually unlock a door of a vehicle or start the vehicle, these days, devices for remotely controlling the vehicle using an external terminal device have been developed.

An example vehicle remote control system is a system in which a driver inserts a special key into a key box of the vehicle, or in which locking/unlock a vehicle door and startup of the vehicle can be performed remotely. In some cases, when the driver who possesses the remote control device has access to the vehicle, the vehicle door is automatically unlocked through low frequency (LF; Bluetooth) communication and radio frequency (RF; Bluetooth) communication with the remote control device so that the door can be opened without inserting the key. Further, the driver can start the vehicle without inserting the key after getting in the vehicle.

A device such as a hand-held smartphone or key fob for wireless communication can be used as the remote control device. For demonstration purposes, a remote control device will be primarily described herein. However, the remote control device may also include a key fob, a smart key, a mobile device, and the like.

Due to characteristics of communication devices, the remote control device typically needs an antenna in order to perform wireless communication with the vehicle. Such antennas are manufactured to be relatively thick in order to ensure durability. Thus, the conventional remote control device is bulky and inconvenient to carry.

Thus, a remote control device product having a reduced exterior thickness has been recently developed. As the thickness of the remote control device is reduced, however, the thickness of a printed circuit board (PCB) inside the remote control device is also reduced, causing battery usage time and available power to decrease. Also, as the thickness of the PCB is reduced, a transmission/receiving distance of the antenna decreases, and vehicle security is compromised as a result.

SUMMARY

It is an aspect of the present disclosure to provide a remote control device in which battery power in the remote control device is efficiently used so that power capacity of the battery can be better preserved. It is another aspect of the present disclosure to provide a remote control device that is capable of preventing a car theft such as a relay attack.

Additional aspects of the disclosure will be set forth in part in the description which follows and, in part, will be apparent from the description, or may be learned by practice of the disclosure.

In accordance with embodiments of the present disclosure, a remote control device for a vehicle includes: a vibration sensor sensing vibration of the remote control device; a communication unit performing communication with the vehicle; and a controller changing an operation mode of the remote control device based on a first signal received from the vehicle via the communication unit.

The first signal may include information about the operation mode of the remote control device generated based on a current location of the remote control device.

When the remote control device is located outside the vehicle, the first signal may include a signal used to change the operation mode of the remote control device to a vibration sensing mode.

When the remote control device is located inside the vehicle, the first signal may include a signal used to change the operation mode of the remote control device to a general mode.

When vibration of the remote control device is sensed after the operation mode of the remote control device is changed to the vibration sensing mode, the controller may change the operation mode of the remote control device to an active mode for a predetermined amount of time.

The active mode may be a mode in which the remote control device is capable of continuously performing wireless communication with the vehicle via the communication unit.

When receiving a second signal from the vehicle during the predetermined amount of time, the controller may change the operation mode of the remote control device to a general mode.

When vibration of the remote control device is not sensed after the operation mode of the remote control device is changed to a vibration sensing mode, the controller may change the operation mode of the remote control device to an inactive mode.

The inactive mode may be a mode in which power of the communication unit is turned off.

The vibration sensor may be disposed at any of: one side of a printed circuit board (PCB) inside the remote control device, both side surfaces of the PCB, or a hole formed in the PCB.

Furthermore, in accordance with embodiments of the present disclosure, a vehicle includes a remote control device, the remote control device including a second sensor sensing vibration of the remote control device; a second communication unit performing communication with the first communication unit; and a second controller changing an operation mode of the remote control device based on an operation mode signal for the remote control device received from the first communication unit via the second communication unit, the vehicle including a first sensor sensing a location of the remote control device; and a first communication unit performing communication with the remote control device.

The first communication unit may transmit an operation mode signal generated based on a current location of the remote control device to the second communication unit.

When it is sensed that the remote control device is located outside of the vehicle, the first communication unit may transmit to the second communication unit a signal used to change the operation mode of the remote control device to a vibration sensing mode.

When it is sensed that the remote control device is located inside the vehicle, the first communication unit may transmit to the second communication unit a signal used to change the operation mode of the remote control device to a general mode.

When vibration of the remote control device is sensed after the operation mode of the remote control device is changed to a vibration sensing mode, the second controller may change the operation mode of the remote control device to an active mode for a predetermined amount time.

The active mode may be a mode in which the second communication unit is capable of continuously performing wireless communication with the first communication unit.

When the second communication unit receives an operation mode signal from the first communication unit during the predetermined amount of time, the second controller may change the operation mode of the remote control device to a general mode.

When vibration of the remote control device is not sensed after the operation mode of the remote control device is changed to a vibration sensing mode, the second controller may change the operation mode of the remote control device to an inactive mode.

The inactive mode may be a mode in which power of the second communication unit is turned off.

The vibration sensor may be disposed at any of: one side of a printed circuit board (PCB) inside the remote control device, both side surfaces of the PCB, or a hole formed in the PCB.

BRIEF DESCRIPTION OF THE DRAWINGS

These and/or other aspects of the disclosure will become apparent and more readily appreciated from the following description of the embodiments, taken in conjunction with the accompanying drawings of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments described in the present specification and configuration shown in the drawings are provided merely for illustrative purposes, and there may be various modifications that may replace the embodiments of the present specification and the drawings at the time of filing the present application.

The terms used in the present specification are merely used to describe particular embodiments, and are not intended to limit the present disclosure. An expression used in the singular encompasses the expression of the plural, unless it has a clearly different meaning in the context.

In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that although the terms first and second are used herein to describe various elements, these elements should not be limited by these terms. These terms are only used to distinguish one element from another element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, embodiments of the present disclosure will be described in detail with reference to the attached drawings so that those skilled in the art can perform the invention easily. In the drawings, irrelevant portions to description will be omitted for clarity. Hereinafter, a vehicle including a remote control device according to the present disclosure will be described with reference to FIGS. 1 and 2.

Figure 1:
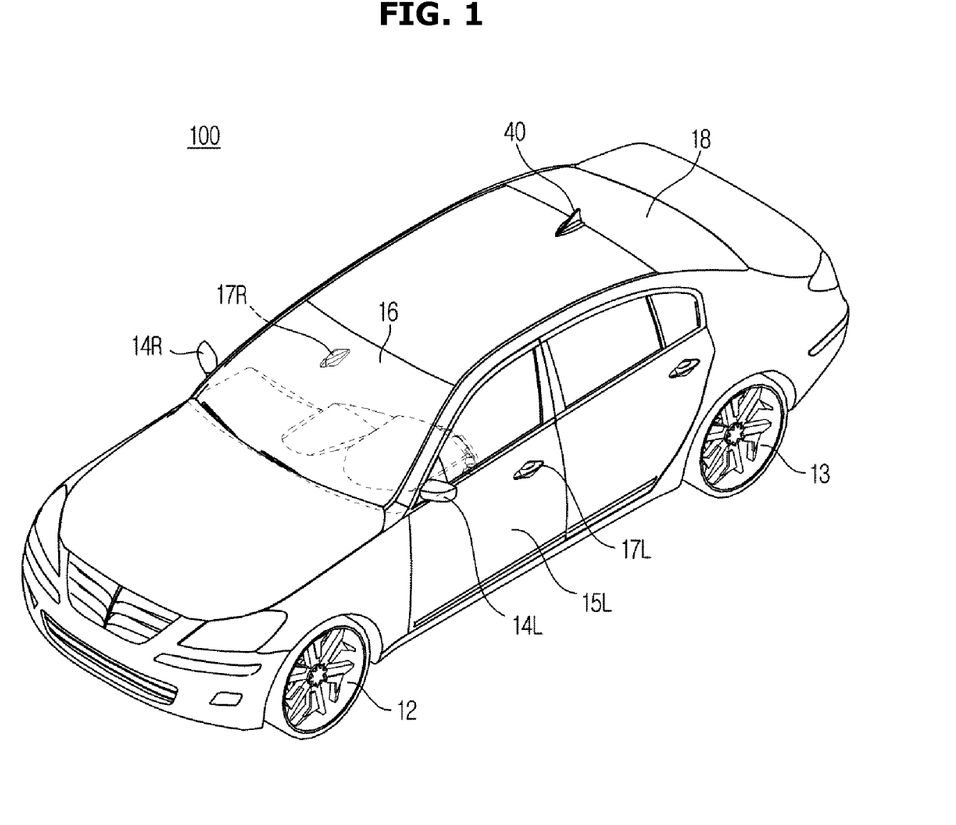
FIG. 1 is a view of the exterior of a vehicle according to embodiments of the present disclosure.
Figure 2:
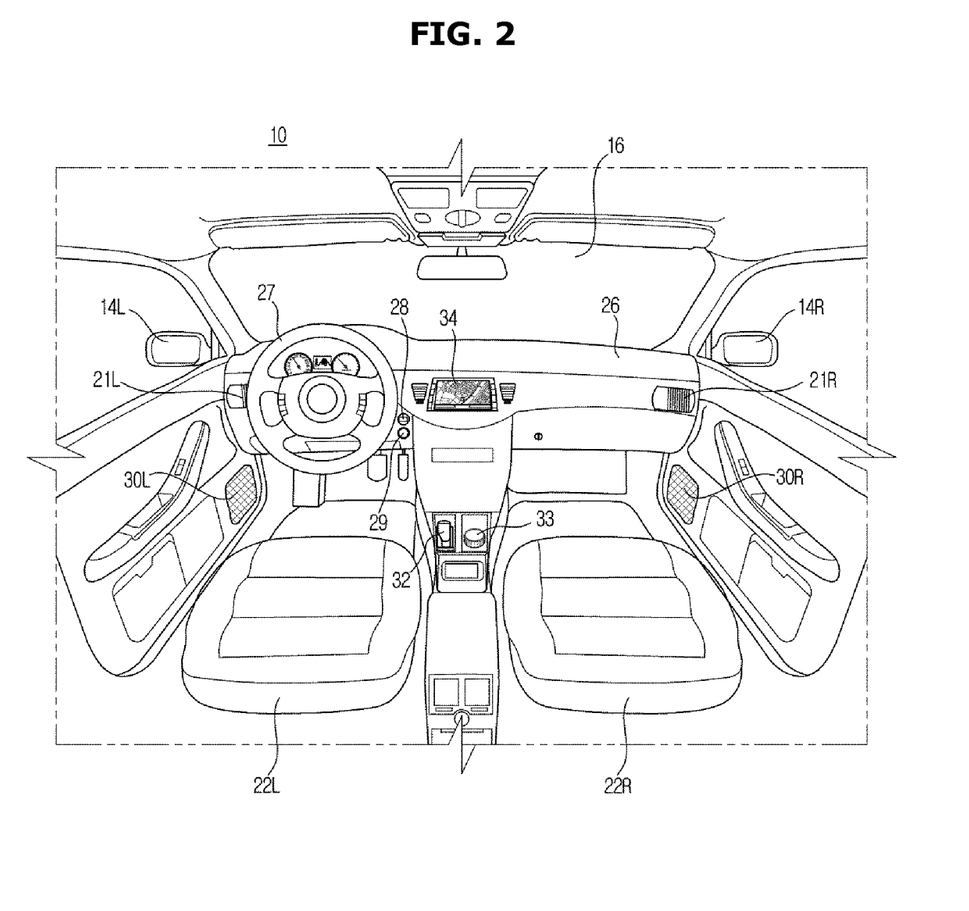
FIG. 2 is a view of the interior of the vehicle according to embodiments of the present disclosure.

FIG. 1 is a view of the exterior of a vehicle according to embodiments of the present disclosure, and FIG. 2 is a view of the interior of the vehicle according to embodiments of the present disclosure. Hereinafter, descriptions of FIGS. 1 and 2 will be provided together so as to prevent redundant descriptions.

Referring to FIG. 1, the exterior of a vehicle 100 according to embodiments of the present disclosure may include wheels 12 and 13 through which the vehicle 100 is moved, doors 15L and 15R configured to shield the inside of the vehicle 100 from the outside, a front glass 16 configured to provide a front view to a user inside the vehicle 100, a rear glass 18 configured to provide a rear view to the user inside the vehicle 100, and side mirrors 14L and 14R configured to provide a side view and a rear view to the user.

The wheels 12 and 13 include a front wheel 12 disposed at the front of the vehicle 100 and a rear wheel 13 disposed at the rear of the vehicle 100, and a driving device (not shown) disposed inside the vehicle 100 may provide a rotational force to the front wheel 12 or the rear wheel 13 so that the vehicle 100 can be moved in a forward/backward direction. Such a driving device may be an engine configured to combust a fossil fuel to generate a rotational force, or a motor configured to receive power from a capacitor to generate a rotational force.

The doors 15L and 15R are pivotably disposed at the left and right of the vehicle 100 so that, when the doors 15L and 15R are opened, the user or a fellow passenger can get in the vehicle 100 and when the doors 15L and 15R are closed, the inside of the vehicle 100 can be shielded from the outside.

Also, handles 17L and 17R configured to open/close the doors 15L and 15R may be disposed at an outer surface of the vehicle 100, and a Bluetooth antenna that is capable of transmitting/receiving low frequency signals and a touch sensor that is capable of the user's touch input may be disposed at the handle 17L.

When the touch sensor of the doors 15L and 15R senses the user's touch input in a state in which the user holds a remote control device (not shown), the vehicle 100 performs authentication with the remote control device (not shown) through a wireless communication network, and when authentication is completed, a door-lock of the vehicle 100 is unlocked so that the door 15L or 15R can be opened by the user pulling the handle 17L or 17R. Here, the user may include not only the user but also the fellow passenger who gets on the vehicle 100.

The front glass 16, which is disposed at an upper side of the front of a body (see 110 of FIG. 8) and through which the user inside the vehicle 100 can acquire visual information about the front of the vehicle 100, is also referred to as wind shield glass.

The rear glass 18, which is disposed at an upper side of the rear of the body and through which the user inside the vehicle 100 can acquire visual information about the rear of the vehicle 100, is also referred to as a rear glass. Also, the rear glass 18 may include a rear glass antenna 50 that removes frost from the glass and simultaneously communicates with an external base station.

Also, an antenna that is capable of communicating with an external server may be disposed at an upper portion of the vehicle 100. In detail, a roof antenna 40 may be disposed at a point where the roof antenna 40 meets with the rear glass 18 as illustrated in FIG. 1.

Also, the side mirrors 14L and 14R may include a left side mirror 14L disposed at the left of the vehicle 100, and a right side mirror 14R disposed at the right of the vehicle 100 so that the user inside the vehicle 100 can acquire visual information about sides and the rear of the vehicle 100.

In addition, the vehicle 100 may include a proximity sensor that senses an obstacle or another vehicle to a rear surface or side surfaces of the vehicle 100, and may include a sensing device such as a rain sensor that senses precipitation and rainfall.

The proximity sensor may transmit sensing signals to the side surfaces or the rear surface of the vehicle 100 and may receive reflection signals reflected from an obstacle such as another vehicle. The proximity sensor may sense whether an obstacle is present at the side surfaces or the rear surface of the vehicle 100 based on wavelengths of the received reflection signals, and may detect the position of the obstacle. An example of such a proximity sensor is a method of transmitting ultrasound or infrared rays and detecting a distance between the proximity sensor and the obstacle using the ultrasound or infrared rays reflected off of the obstacle.

It should be noted the exterior of the vehicle 100 as described above and illustrated in FIG. 1 is provided merely for demonstration purposes, and thus does not limit the scope of the present disclosure.

As shown in FIG. 2, an audio video navigation (AVN) terminal including a navigation device may be disposed in the central region of a dashboard 26. The AVN terminal may include a display 34 configured to display a video or an image provided from the AVN terminal. The display 34 may selectively display at least one from among an audio screen, a video screen, and a navigation screen, and may display various control screens relating to the vehicle 100 and a screen relating to additional functions.

The display 34 may be implemented using a liquid crystal display (LCD), light-emitting diodes (LED), a plasma display panel (PDP), organic light emitting diodes (OLED), cathode ray tubes (CRT), or the like.

Also, a center input unit 33 of a jog/shuttle type may also be provided between a driver's seat 18L and a passenger seat 18R. The user may input control instructions by turning or pressing the center input unit 33 or pushing the center input unit 33 in an up, down, left, or right direction.

The vehicle 100 may include speakers 30L and 30R configured to output sound. The speakers 30L and 30R may output sound required to perform an audio function, a video function, a navigation function, and other additional functions.

A key home 28 into which a remote control device (not shown) such as a key fob may be inserted may be formed in the dashboard 26 at a side of the driver's seat 18L. The remote control device (not shown) capable of performing startup of the vehicle 100 may be inserted into the key home 28.

Also, the dashboard 26 may include a startup button 29 configured to turn the vehicle 100 on or off, and when the remote control device is inserted into the key home 28 or authentication between the remote control device and the vehicle 100 through the wireless communication network is successful, the vehicle 100 can be turned on by the user's pressing of a startup button 29.

Meanwhile, an air conditioning device may be provided in the vehicle 100 so as to perform both heating and cooling and to discharge heated or cooled air through vents 21L and 21R so that the temperature inside the vehicle 100 can be controlled.

It should be noted the interior of the vehicle 100 as described above and illustrated in FIG. 2 is provided merely for demonstration purposes, and thus does not limit the scope of the present disclosure.

Figure 3:
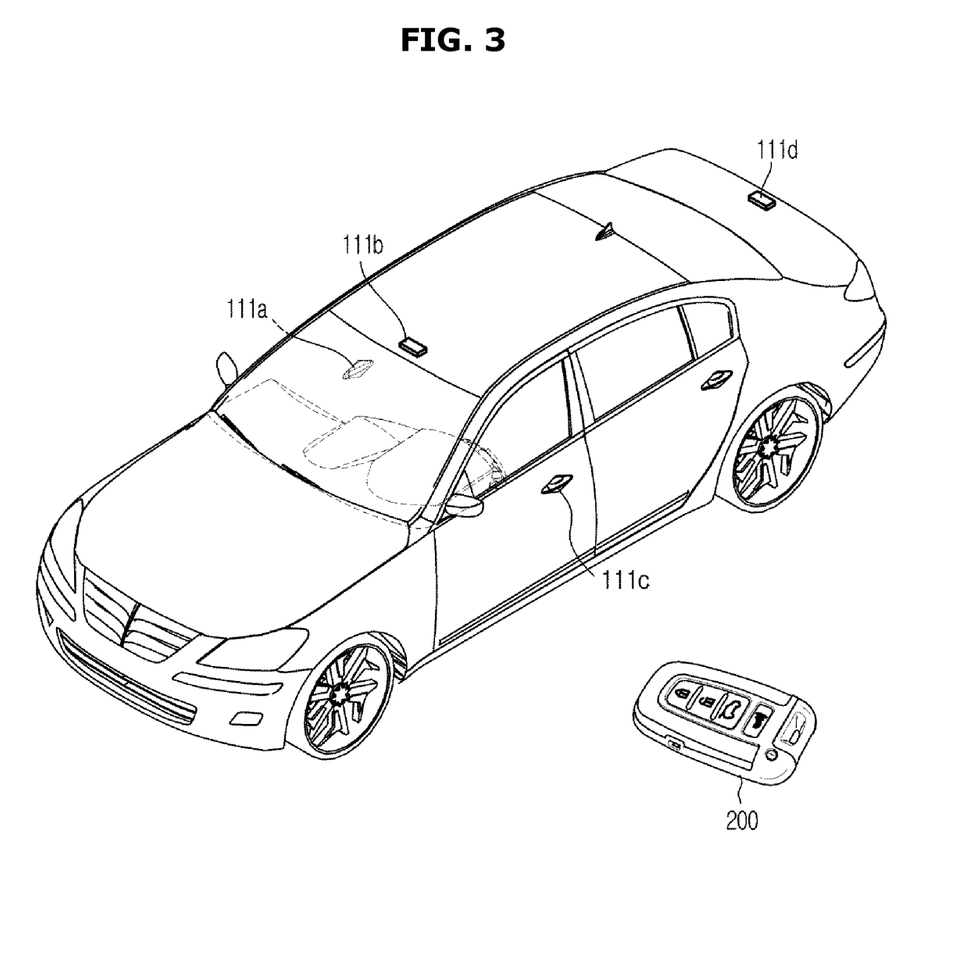
FIG. 3 is an exemplary view of a vehicle and a remote control device configured to perform communication with the vehicle, according to embodiments of the present disclosure.

FIG. 3 is an exemplary view of the vehicle 100 and a remote control device 200 configured to perform communication with the vehicle 100, according to embodiments of the present disclosure.

The remote control device 200 is in a direct contact with the vehicle 100 or is connected to the vehicle 100 through transmission/reception of wireless signals.

As an example and as illustrated in FIG. 3, the remote control device 200 may be a key fob connected to the vehicle 100 so as to unlock the door-lock of the vehicle 100 or enable vehicle starting and driving.

Even when the remote control device 200 is not a key fob, the remote control device 200 as shown in FIG. 3 may include all input devices for controlling the vehicle 100 that unlock the door-lock of the vehicle 100 or enable startup and driving of the vehicle 100.

For example, when a mobile device functions as a remote control device, the remote control device 200 according to embodiments of the present disclosure may include the mobile device. In this case, an application that is capable of operating as the remote control device 200 may be installed in the mobile device. Thus, the mobile device may be sold as a product with the built-in application or may download the application from a server after being sold. Also, the mobile device may undergo an authentication procedure in order to operate as the remote control device 200 for the vehicle 100.

The remote control device 200 may be sold together with the vehicle 100, and authentication information for connection to the vehicle 100 may be stored beforehand in the remote control device 200.

The remote control device 200 and the vehicle 100 may transmit/receive signals via an LF communication network and an RF communication network so as to perform a mutual authentication procedure.

The LF communication network, which is a communication network having a low-frequency band used to transmit/receive LF signals required to search for the remote control device 200 using the vehicle 100, may be a communication network having a frequency band that is equal to or higher than 20 kHz and is equal to or less than 150 kHz.

When the LF signals are transmitted/received via the LF communication network, due to characteristics caused by the low-frequency band, a distance at which the LF signals can be transmitted/received, is shorter than a transmission/reception distance for the RF communication network having a RF band. For example, the LF signal transmission/reception range may be about 5 m, and the RF signal transmission/reception range may be about 100 m.

Thus, the vehicle 100 may transmit the LF signals via the LF communication network, may search for the remote control device 200 close to the vehicle 100, and may request information required for authentication.

In order to transmit the LF signals, the vehicle 100 according to an embodiment may include an LF communication unit 114, and the LF communication unit 114 may include one or more LF antennas 114a through 114d.

Each of the LF antennas 114a through 114d is disposed at a front, rear, sides, or inside the body of the vehicle 100 and transmits the LF signals at various angles and intensities. Reception intensities and reception directions of the LF signals of the remote control device 200 may be changed according to the positions of the LF antennas 114a through 114d.

Hereinafter, an LF antenna 114a disposed at a handle 17R of the right door 15R, an LF antenna 114c disposed at a handle 17L of the left door 15L, an LF antenna 114b disposed on a top end of the body, and an LF antenna 114d disposed in a trunk will be described as an example. However, the positions of the LF antennas 114a through 114d are not limited thereto.

When the vehicle 100 transmits the LF signals via the LF antennas 114a through 114d, the remote control device 200 according to embodiments of the present disclosure may receive the LF signals transmitted via the LF antennas 114a through 114d.

The RF communication network, which is a communication network in a frequency band in which the vehicle 100 receives RF signals from the remote control device 200 that receives the LF signals, may be a communication network having an ultra high frequency (UHF) band that is equal to or higher than 300 MHz and is equal to or less than 450 MHz. When the RF signals are transmitted/received via the RF communication network, a signal transmission/reception range is longer than a transmission/reception range for the LF communication network having a low frequency band.

Figure 4:
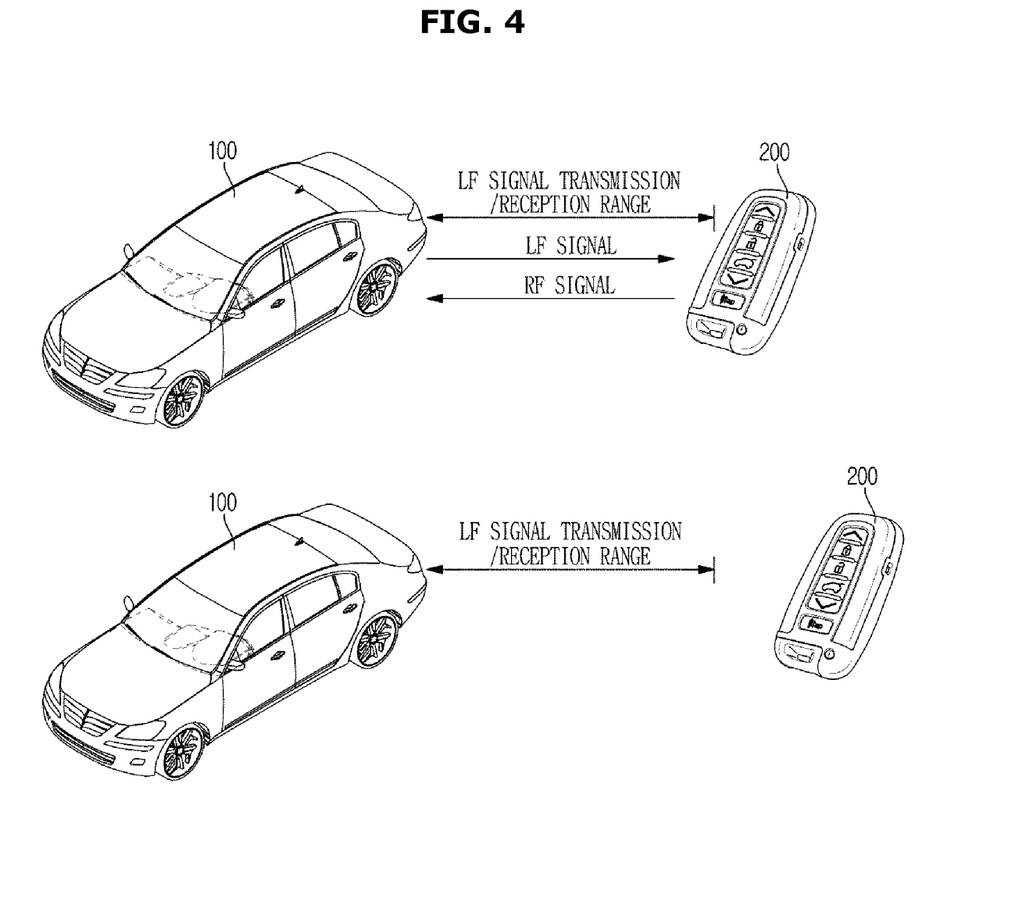
FIG. 4 is a view for explaining an authentication procedure between the vehicle and the remote control device to be performed at a distance at which various signals can be transmitted/received.

FIG. 4 is a view for explaining an authentication procedure between the vehicle and the remote control device to be performed at a distance at which various signals can be transmitted/received.

As shown in FIG. 4, when the remote control device 200 is disposed within the transmission/receiving range of the LF signals from the vehicle 100, the remote control device 200 may receive the LF signals from the vehicle 100 via the LF communication network and may transmit the RF signals to the vehicle 100 via the RF communication network.

Meanwhile, when the remote control device 200 is not disposed within the transmission/reception range of the LF signals from the vehicle 100, even when the vehicle 100 transmits the LF signals to the periphery of the vehicle 100 via the LF communication network, the remote control device 200 cannot receive them. Thus, the remote control device 200 that does not receive the LF signals cannot transmit the RF signals, which are response signals, to the vehicle 100.

Figure 5:
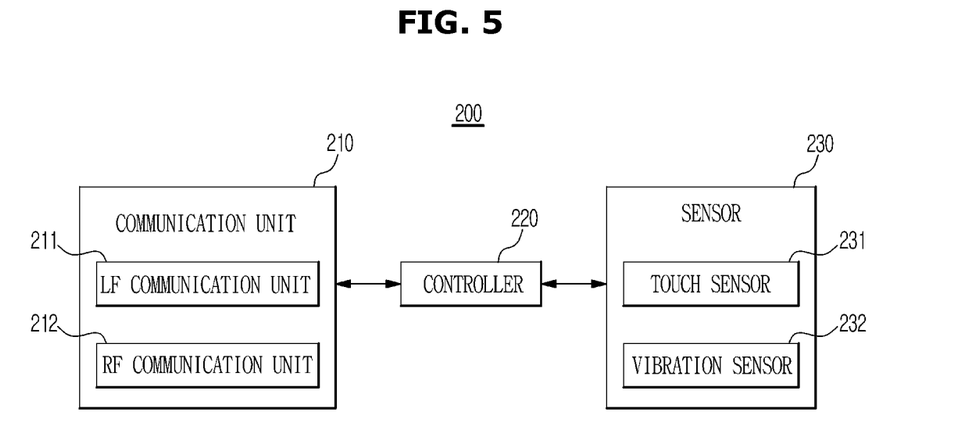
FIG. 5 is a block diagram of a portion of a configuration of the remote control device according to embodiments of the present disclosure.

FIG. 5 is a block diagram of a portion of a configuration of the remote control device 200 according to embodiments of the present disclosure.

As shown in FIG. 5, the remote control device 200 according to embodiments of the present disclosure may include a communication unit 210 configured to transmit/receive signals to/from the vehicle 100, a controller 220 configured to control operations of elements of the remote control device 200, and a sensor 230 configured to sense the user's touch and vibration of the remote control device 200.

The communication unit 210 of the remote control device 200 may include an LF communication unit 211 that receives LF signals within an LF signal reception range via the LF communication network, and an RF communication unit 212 that receives RF signals within an RF signal transmission range via the RF communication network.

The LF communication unit 211 may include a communication port configured to connect the LF communication network to the controller 220 of the remote control device 200, and an LF communication interface including a receiver that receives the LF signals.

Also, the LF communication unit 211 may further include an LF signal conversion module configured to demodulate analog LF signals, which are received via a communication interface, into digital control signals.

The RF communication unit 212 may transmit the RF signals to the vehicle 100 via the RF communication network.

Also, the RF communication unit 212 may further include an RF signal conversion module configured to modulate the digital control signals, which are output from the controller 220 via the RF communication interface according to control of the controller 220, into analog RF signals.

The controller 220 may control elements included in the remote control device 200 and simultaneously may change an operation mode of the remote control device 200.

In detail, the controller 220 may change the operation mode of the remote control device 200 based on signals including information about the operation mode of the remote control device 200 received from the vehicle 100 via the communication unit 210.

For example, when the communication unit 210 receives a vibration sensing mode signal from the vehicle 100, the controller 220 may change the remote control device 200 to the vibration sensing mode, and when the communication unit 210 receives a general mode signal, the controller 220 may change the remote control device 200 to the general mode. Also, when the communication unit 210 receives an inactive mode signal, the communication unit 210 may change the remote control device 200 to the inactive mode.

Here, an active mode includes a mode in which the remote control device 200 is capable of continuously performing wireless communication with the vehicle 100 via the communication unit 210, and the inactive mode may include a mode in which power of the communication unit 210 is turned off. A detailed description thereof will be provided later with reference to FIG. 6.

Also, although not shown, the remote control device 200 may include a storage unit in which various pieces of information about the remote control device 200 are stored.

The storage unit may include a processor for generating control signals according to a stored program and data, and the storage unit and the controller 220 may be implemented using a separate memory device and a separate processor, or may be implemented in a single device.

The sensor 230 may include a touch sensor 231 that senses the user's touch of the sensor 230, and a vibration sensor 232 that senses vibration of the remote control device 200.

The touch sensor 231 may sense the user's touch input. For example, the touch sensor 231 may include at least one from among a touch pad, a touch screen, a touch button, and a tact switch.

Thus, the touch sensor 231 may detect a simple touch input such as the user pressing a button, or a patterned touch continuously input such as the user drawing a picture or character.

Also, the touch input (or touch input information) may be used as control instructions for controlling the vehicle 100.

The vibration sensor 232 may sense three-dimensional (3D) shaking motion or vibration of the remote control device 200.

Thus, the vibration sensor 232 may include an acceleration sensor (not shown) and an angular velocity sensor (not shown) for sensing vibration of the remote control device 200, and the vibration sensor 232 may be a piezoelectric type, a coin cell type, thermoelectric type, a resistance line strain gauge type, or a semiconductor strain gauge type.

Vibration input (or vibration input information) may be used as information for detecting an active or inactive status of the remote control device 200 that will be described later.

Figure 6:
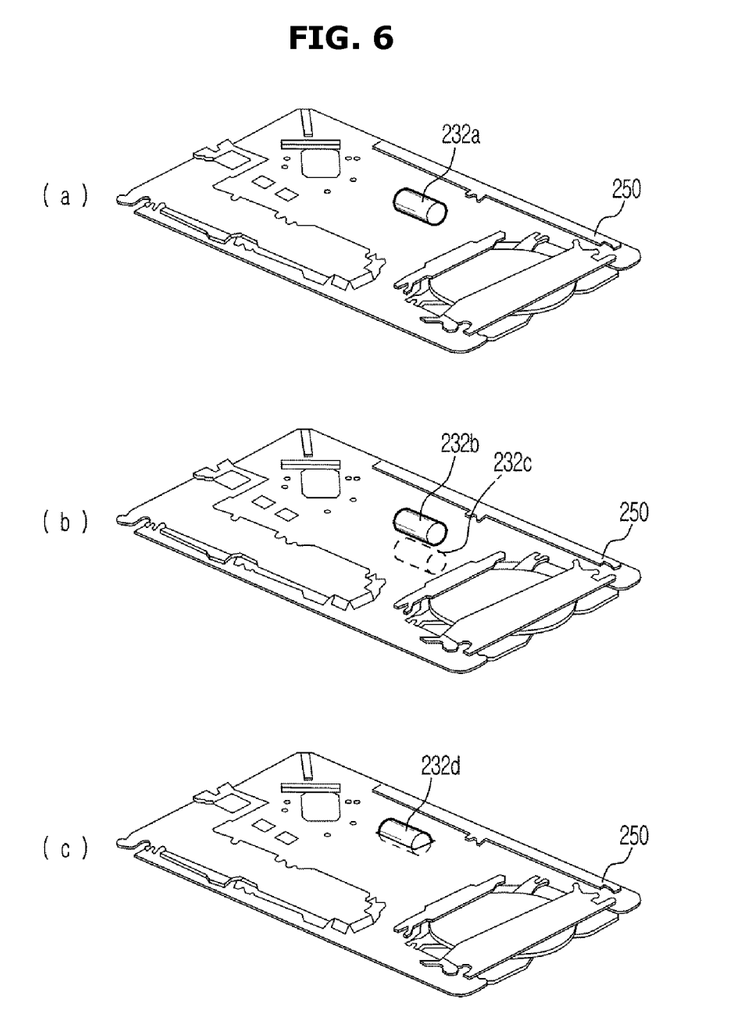
FIG. 6 is a view showing various positions in which a vibration sensor may be disposed, according to embodiments of the present disclosure.

FIG. 6 includes exemplary views of a state in which the vibration sensor 232 is disposed in various locations on a printed circuit board (PCB) 250 included in the remote control device 200 in FIG. 5.

As illustrated in view (a) of FIG. 6, a vibration sensor 232a of the vibration sensor 232a may be coupled onto (or mounted on) the PCB 250.

In this case, although not shown, the vibration sensor 232a may be coupled to the PCB 250 using a sub PCB (or a second PCB)(not shown).

Also, as illustrated in view (b) of FIG. 6, a vibration sensor 232b may be coupled to at least one PCB 250. In this case, the vibration sensor 232b may be coupled to the PCB 250 using different sub PCBs (or second and third PCBs) (not shown).

Also, as illustrated in view (c) of FIG. 6, when a vibration sensor 232c is coupled to the PCB 250, in order to prevent the thickness of the remote control device 200 from increasing, a hole may be formed in a position in which the vibration sensor 232c of the PCB 250 is coupled to the PCB 250, and the vibration sensor 232c may be inserted into the hole so that the vibration sensor 232c can be coupled to the PCB 250.

Figure 7:
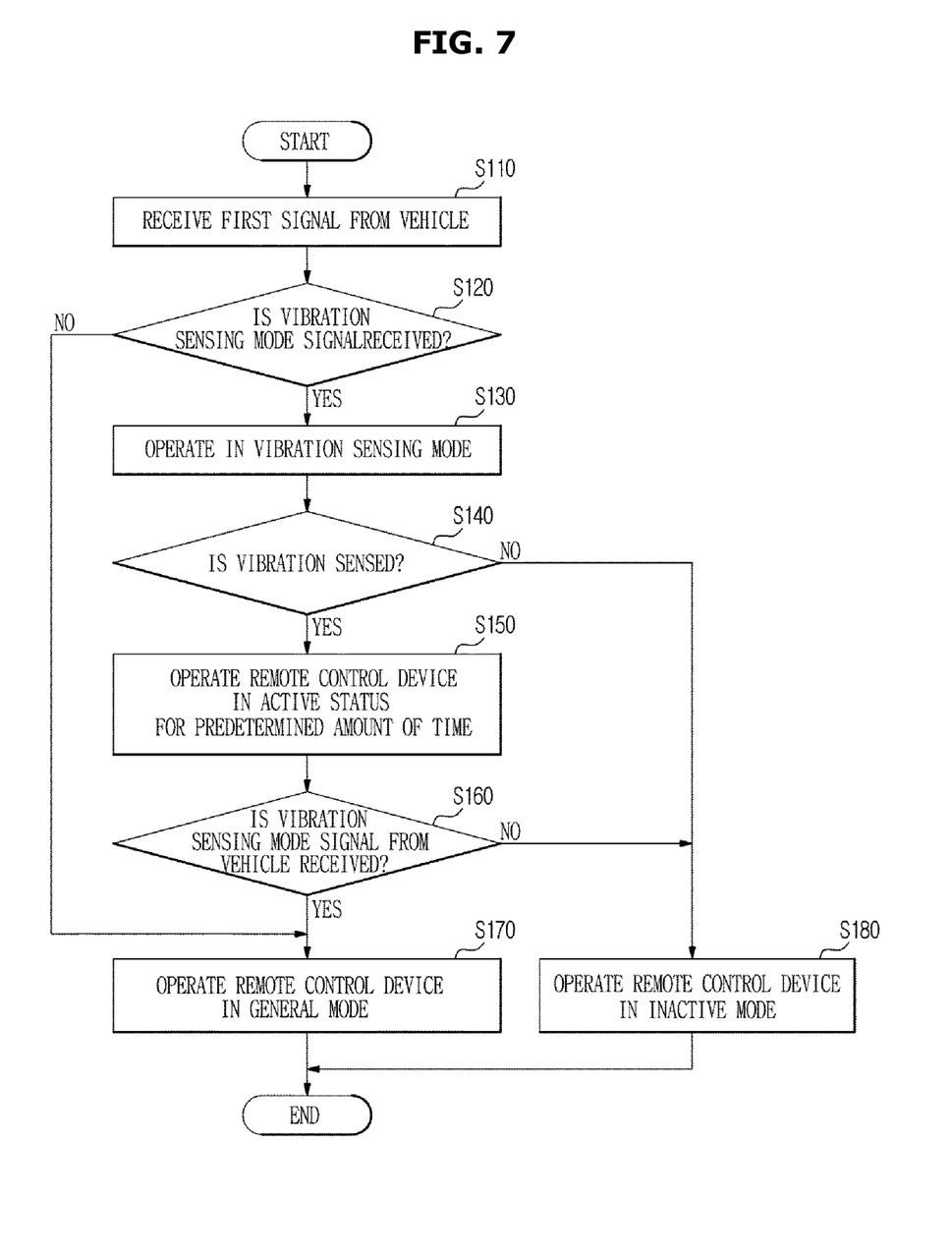
FIG. 7 is a flowchart illustrating a method of controlling the remote control device, according to embodiments of the present disclosure.

FIG. 7 is a flowchart illustrating a method of controlling the remote control device 200, according to embodiments of the present disclosure.

As shown in FIG. 7, the remote control device 200 receives a first signal from the vehicle 100 (S110).

The first signal refers to a signal including information about the operation mode of the remote control device 200 generated based on a current location of the remote control device 200.

Although not shown, the vehicle 100 may determine a current location of the remote control device 200 using an antenna or a sensor inside the vehicle 100.

In detail, the vehicle 100 may determine whether the remote control device 200 is located inside or outside the vehicle 100, and may transmit the result of determination to the remote control device 200 using an LF method.

In this case, the vehicle 100 may transmit a passive request signal that is a mode conversion signal of the remote control device 200, and the remote control device 200 may transmit a passive response signal that is a response signal to the vehicle 100 using an RF method.

In detail, when it is determined that the remote control device 200 is located outside the vehicle 100, the vehicle 100 may transmit a signal for changing the operation mode of the remote control device 200 to a vibration sensing mode. Conversely, when it is determined that the remote control device 200 is located inside the vehicle 100, the vehicle 100 may transmit a signal for changing the operation mode of the remote control device 200 to a general mode to the remote control device 200.

When the remote control device 200 receives the vibration sensing mode signal from the vehicle 100 (S120), the remote control device 200 may change the operation mode of the remote control device 200 to the vibration sensing mode (S130).

The vibration sensing mode refers to a mode in which the vibration sensor 232 senses vibration of the remote control device 200. In the vibration sensing mode, the remote control device 200 operates in inactive status (i.e., inactive mode), and the operation mode of the remote control device 200 may be maintained in the inactive mode or may be changed to the active mode depending on whether the remote control device 200 senses vibration or not.

When the remote control device 200 does not receive the vibration sensing mode signal, the remote control device 200 is located inside the vehicle 100. Thus, the operation mode of the remote control device 200 is changed to the general mode so that the remote control device 200 can be maintained in active status (S170).

Here, the general mode refers to a mode in which the vibration sensing mode is in inactive status and the remote control device 200 operates in active status continuously. In this case, the remote control device 200 may receive LF signals from the vehicle 100 continuously.

When the operation mode of the remote control device 200 is changed to the vibration sensing mode, it is determined whether vibration of the remote control device 200 is sensed (S140).

In Operation S140, vibration of the remote control device 200 is not detected, and the operation mode of the remote control device 200 may be continuously maintained in the inactive mode (S180).

However, when vibration of the remote control device 200 is detected in Operation S140, the operation mode of the remote control device 200 may be changed to the active mode for a predetermined amount of time (S150).

In the active mode, the remote control device 200, which is in a state in which it is able to receive the LF signals from the vehicle 100, may request authentication while performing communication with the vehicle 100. The predetermined amount of time may be set to various amounts according to the user's environment.

Subsequently, the remote control device 200 receives a second signal from the vehicle 100 and determines whether the received second signal is of the vibration sensing mode. When the remote control device 200 receives the vibration sensing mode signal from the vehicle 100 (S160), the operation mode of the remote control device 200 may be changed to the general mode. However, when the remote control device 200 does not receive the vibration sensing mode signal, the remote control device 200 may operate in the inactive mode (S170 and S180).

The second signal having the same characteristics as those of the first signal refers to a signal including information about the operation mode of the remote control device 200 generated based on the current location of the remote control device 200.

In this way, when the remote control device 200 is located outside the vehicle 100, the remote control device 200 changes the operation mode to inactive status according to the signal received from the vehicle 100, and only when vibration of the remote control device 200 is sensed does the remote control device 200 wake up and perform communication with the vehicle 100 only for the predetermined amount time so that power consumption of a battery (not shown) can be reduced.

Figure 8:
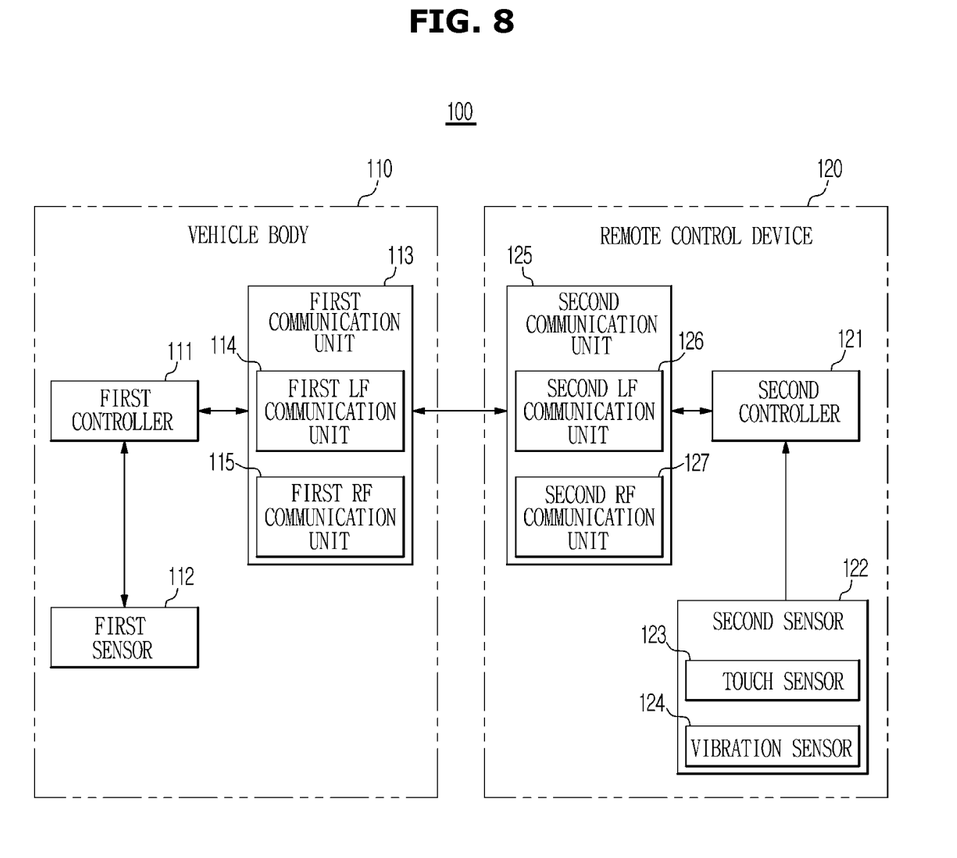
FIG. 8 is a block diagram of a portion of an additional configuration of a vehicle according to embodiments of the present disclosure.

FIG. 8 is a block diagram of a portion of an additional configuration of the vehicle 100 according to embodiments of the present disclosure.

As shown in FIG. 8, the vehicle 100 according to embodiments of the present disclosure may include a body 110 and a remote control device 120.

In detail, the body 110 may include a first controller 111 configured to control various devices of the body 110, a first sensor 112 configured to sense a current location of the remote control device 120, and a first communication unit 113 configured to transmit/receive signals to/from the remote control device 120.

The remote control device 120 may include a second controller 121 configured to control operations of elements of the remote control device 120, a second sensor 122 configured to sense the user's touch and vibration of the remote control device 120, and a second communication unit 125 configured to perform communication with the first communication unit 113.

The remote control device 120 of FIG. 8 has the same elements and the same operating principle of those of the remote control device 200 illustrated in FIG. 5. Thus, hereinafter, descriptions of the remote control device 120 of FIG. 8 will be omitted, and only the body 110 will be described.

The first sensor 112 may sense a current location of the remote control device 120 and may transmit the sensing result to the controller 111.

In detail, when it is sensed that the remote control device 120 is located outside the vehicle 100, the first sensor 112 may transmit the sensing result to the first controller 111. Subsequently, the first controller 111 may transmit a first signal including a vibration sensing mode signal to the first communication unit 113.

Thus, the first sensor 112 may include various sensors and devices for sensing the current location of the remote control device 120.

The first controller 111 may control elements included in the body 110. Thus, the first controller 111 may be implemented with a memory (not shown) for storing data on an algorithm for controlling operations of the elements inside the body 110 or a program for executing the algorithm, and with a processor (not shown) for performing the above-described operation using the data stored in the memory. In this case, the memory and the processor may be implemented using separate chips. Alternatively, the memory and the processor may be implemented using a single chip.

The first communication unit 113 may perform communication with the second communication unit 125 of the remote control device 120. In detail, the first communication unit 113 may transmit the first signal generated in the first controller 111 and the second signal to the second communication unit 125. A method of performing communication between the first communication unit 113 and the second communication unit 125 is the same as a method of performing communication with the vehicle 100 using the communication unit 210 in FIG. 5, and thus, descriptions thereof will be omitted.

Figure 9:
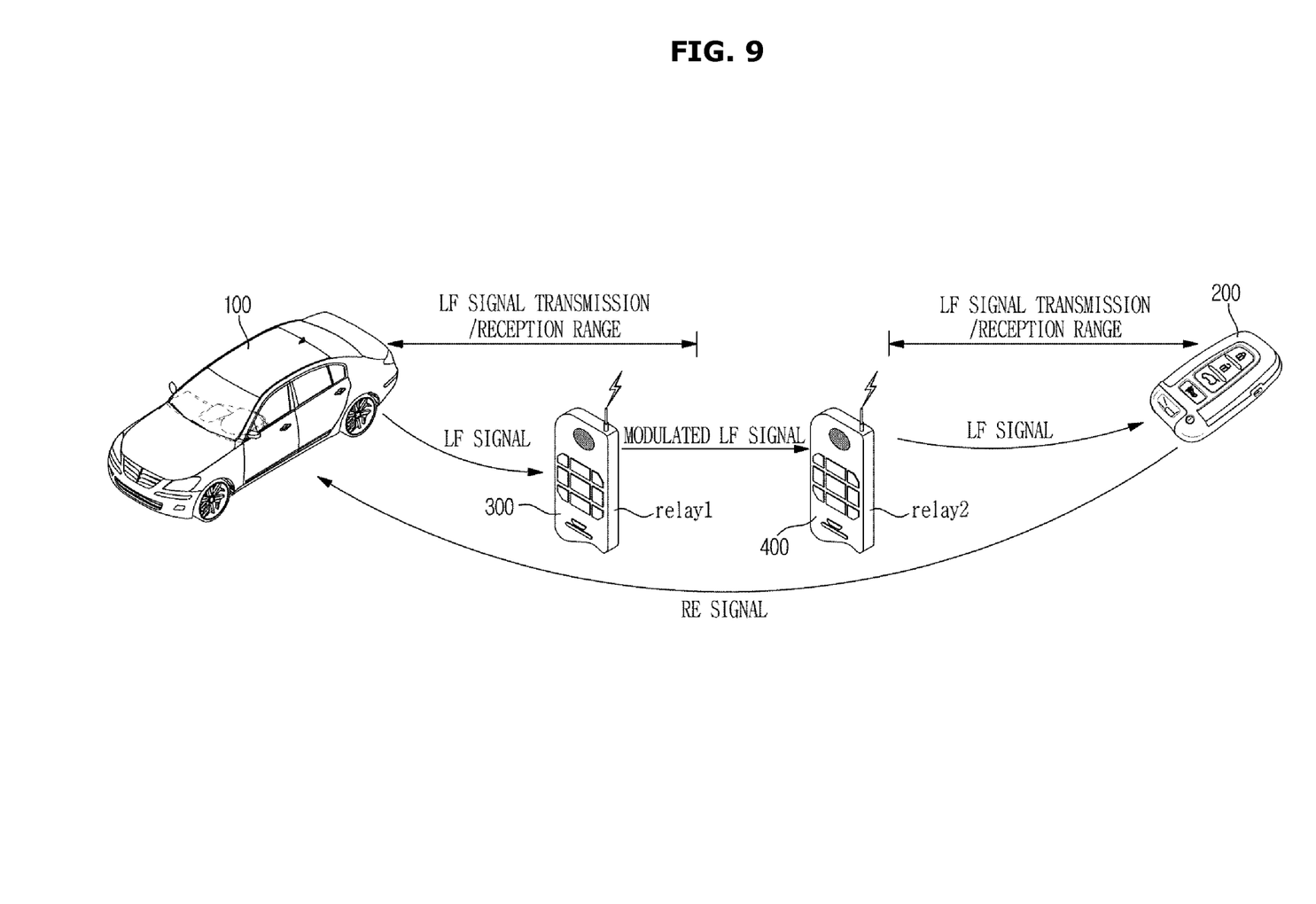
FIG. 9 is a view for explaining a relay attack in which a relay attack is performed using a plurality of relay devices.

FIG. 9 is a view for explaining a relay attack in which a relay attack is performed using a plurality of relay devices.

As shown in FIG. 9, even when the remote control device 200 is not located within an LF signal transmission/reception range, when a first relay device relay1 that attempts hacking is involved in an LF signal transmission procedure between the vehicle 100 and the remote control device 200, the LF signal transmitted from the vehicle 100 may be transmitted to the remote control device 200 via the first relay device relay1 that is located within the LF signal transmission range of the vehicle 100 and is located within an LF signal transmission/reception range of the remote control device 200.

Also, even when no relay device is located within the LF signal transmission/reception range of the remote control device 200, a second relay device relay2 is located within the LF signal transmission range of the vehicle 100, and a third relay device relay3 is located within the LF signal transmission/reception range of the remote control device 200. The second relay device relay2 transmits the LF signals transmitted from the vehicle 100 to the third relay device relay3, and the third relay device relay3 transmits the LF signals to the remote control device 200 so that the LF signals can be transmitted to the remote control device 200 from a long distance. The remote control device 200, which is located within the RF signal transmission/reception range of the vehicle 100, transmits the RF signals to the vehicle 100 so that an authentication procedure is abnormally completed, thus compromising the security of the vehicle 100.

However, the remote control device 200 according to an embodiment and the vehicle 100 including the same may perform external communication only when the user uses the remote control device 200 and does not perform external communication when the user does not use the remote control device 200. Thus, the relay attack illustrated in FIG. 9 can be prevented.

Until now, the elements of the remote control device 200 according to embodiments of the present disclosure and the vehicle 100 including the same have been described.

As technology has developed, remote control device products having a reduced exterior thickness have been developed. However, as the thickness of the product (e.g., smart key) is reduced, the thickness of the PCB inside the vehicle is also reduced, causing battery time or available power to decrease. Also, a transmission/reception distance of an antenna is diminished, and the security of a vehicle can be compromised.

However, in the remote control device according to embodiments of the present disclosure, the operation mode of the remote control device is changed according to the current location of the remote control device so that, when the user is not using the remote control device (e.g., key fob), the operation mode is changed to an inactive mode, and the relay attack can be prevented in advance.

Various corrections and modifications can be made by those skilled in the art from the above description. For example, even though described technologies are performed in a different order from the order of the described method or described elements, such as a system, a structure, a device, a circuit, and the like, are coupled to or combined with each other in a different form from the form of the described method or are replaced or substituted by other elements or equivalents, proper results can be achieved. Thus, other embodiments and equivalents to the claims are within the scope of the following claims.

In a remote control device according to embodiments of the present disclosure, an operation mode is changed according to a current location of the remote control device so that power can be efficiently used in the remote control device car theft such as a relay attack can be prevented in advance.

Although certain embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A remote control device for a vehicle, the remote control device comprising:
   a vibration sensor sensing vibration of the remote control device;
   a communication unit performing communication with the vehicle; and
   a controller changing an operation mode of the remote control device based on a first signal received from the vehicle via the communication unit,
   wherein, when the remote control device is located outside of the vehicle, the first signal includes a signal used to change the operation mode of the remote control device to a vibration sensing mode.

2. The remote control device according to claim 1, wherein the first signal includes information about the operation mode of the remote control device generated based on a current location of the remote control device.

3. The remote control device according to claim 1, wherein, when the remote control device is located inside the vehicle, the first signal includes a signal used to change the operation mode of the remote control device to a general mode.

4. The remote control device according to claim 1, wherein, when vibration of the remote control device is sensed after the operation mode of the remote control device is changed to the vibration sensing mode, the controller changes the operation mode of the remote control device to an active mode for a predetermined amount of time.

5. The remote control device according to claim 4, wherein the active mode is a mode in which the remote control device is capable of continuously performing wireless communication with the vehicle via the communication unit.

6. The remote control device according to claim 4, wherein, when receiving a second signal from the vehicle during the predetermined amount of time, the controller changes the operation mode of the remote control device to a general mode.

7. The remote control device according to claim 1, wherein, when vibration of the remote control device is not sensed after the operation mode of the remote control device is changed to a vibration sensing mode, the controller changes the operation mode of the remote control device to an inactive mode.

8. The remote control device according to claim 7, wherein the inactive mode is a mode in which power of the communication unit is turned off.

9. The remote control device according to claim 1, wherein the vibration sensor is disposed at any of: one side of a printed circuit board (PCB) inside the remote control device, both side surfaces of the PCB, or a hole formed in the PCB.

10. A vehicle including a remote control device, the vehicle comprising:
    a first sensor sensing a location of the remote control device; and
    a first communication unit performing communication with the remote control device,
    wherein the remote control device includes:
      a second sensor sensing vibration of the remote control device;
      a second communication unit performing communication with the first communication unit; and
      a second controller changing an operation mode of the remote control device based on an operation mode signal for the remote control device received from the first communication unit via the second communication unit.

11. The vehicle according to claim 10, wherein the first communication unit transmits an operation mode signal generated based on a current location of the remote control device to the second communication unit.

12. The vehicle according to claim 11, wherein, when it is sensed that the remote control device is located outside of the vehicle, the first communication unit transmits to the second communication unit a signal used to change the operation mode of the remote control device to a vibration sensing mode.

13. The vehicle according to claim 11, wherein, when it is sensed that the remote control device is located inside the vehicle, the first communication unit transmits to the second communication unit a signal used to change the operation mode of the remote control device to a general mode.

14. The vehicle according to claim 12, wherein, when vibration of the remote control device is sensed after the operation mode of the remote control device is changed to a vibration sensing mode, the second controller changes the operation mode of the remote control device to an active mode for a predetermined amount of time.

15. The vehicle according to claim 14, wherein the active mode is a mode in which the second communication unit is capable of continuously performing wireless communication with the first communication unit.

16. The vehicle according to claim 14, wherein, when the second communication unit receives an operation mode signal from the first communication unit during the predetermined amount of time, the second controller changes the operation mode of the remote control device to a general mode.

17. The vehicle according to claim 12, wherein, when vibration of the remote control device is not sensed after the operation mode of the remote control device is changed to a vibration sensing mode, the second controller changes the operation mode of the remote control device to an inactive mode.

18. The vehicle according to claim 17, wherein the inactive mode is a mode in which power of the second communication unit is turned off.

19. The vehicle according to claim 10, wherein the vibration sensor is disposed at any of: one side of a printed circuit board (PCB) inside the remote control device, both side surfaces of the PCB, or a hole formed in the PCB.

* * * * *